UNITED STATES PATENT OFFICE.

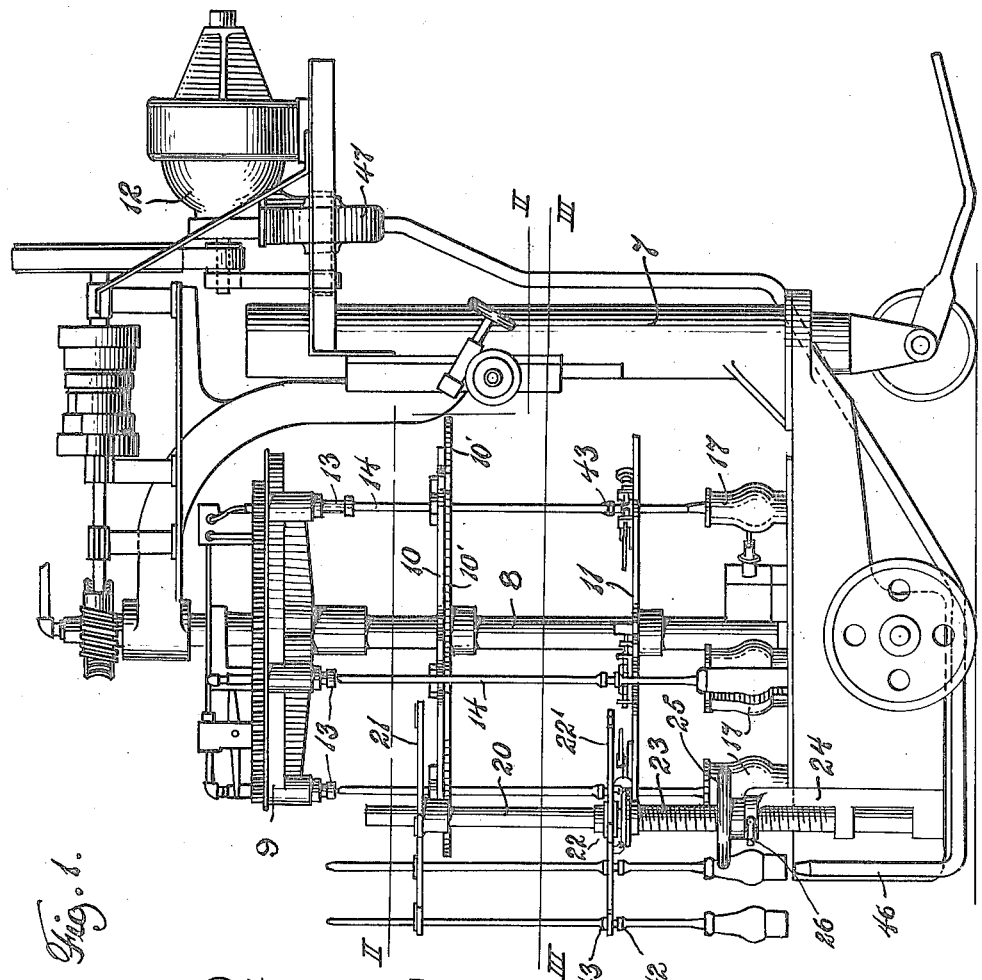
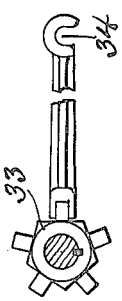
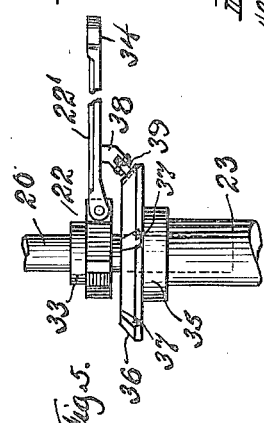
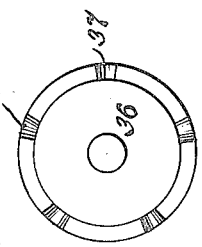

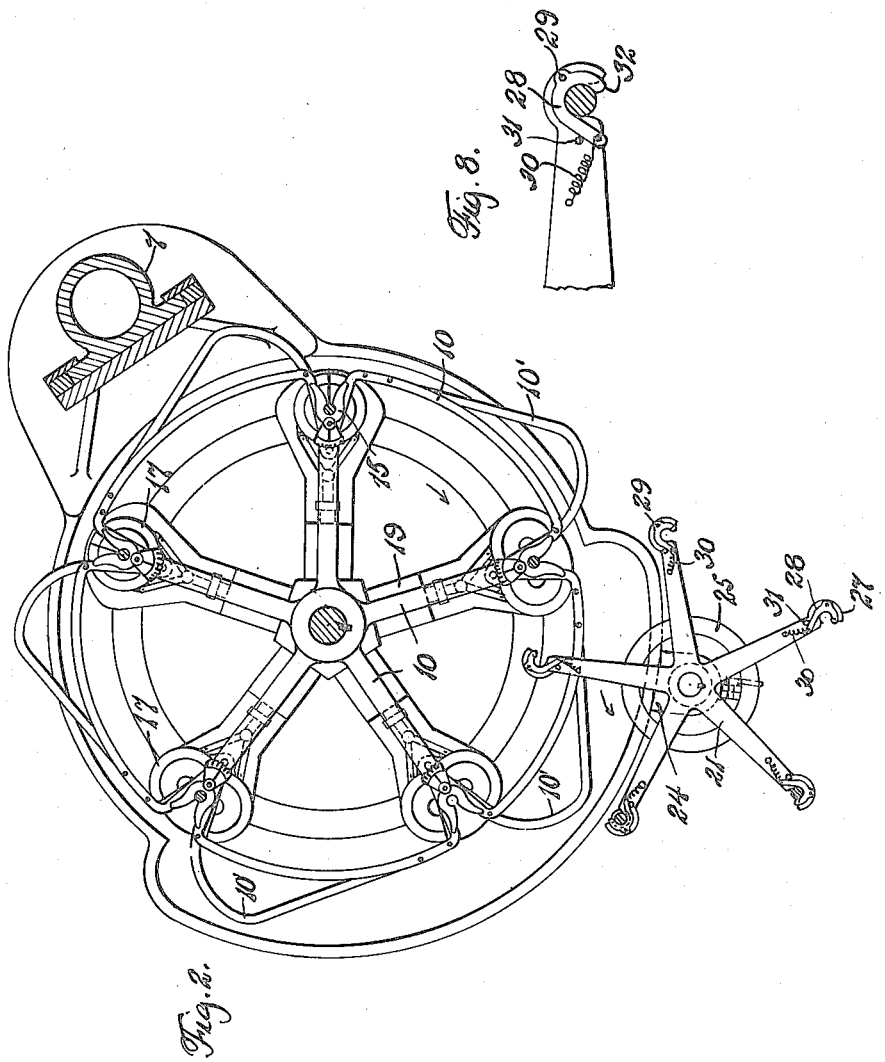

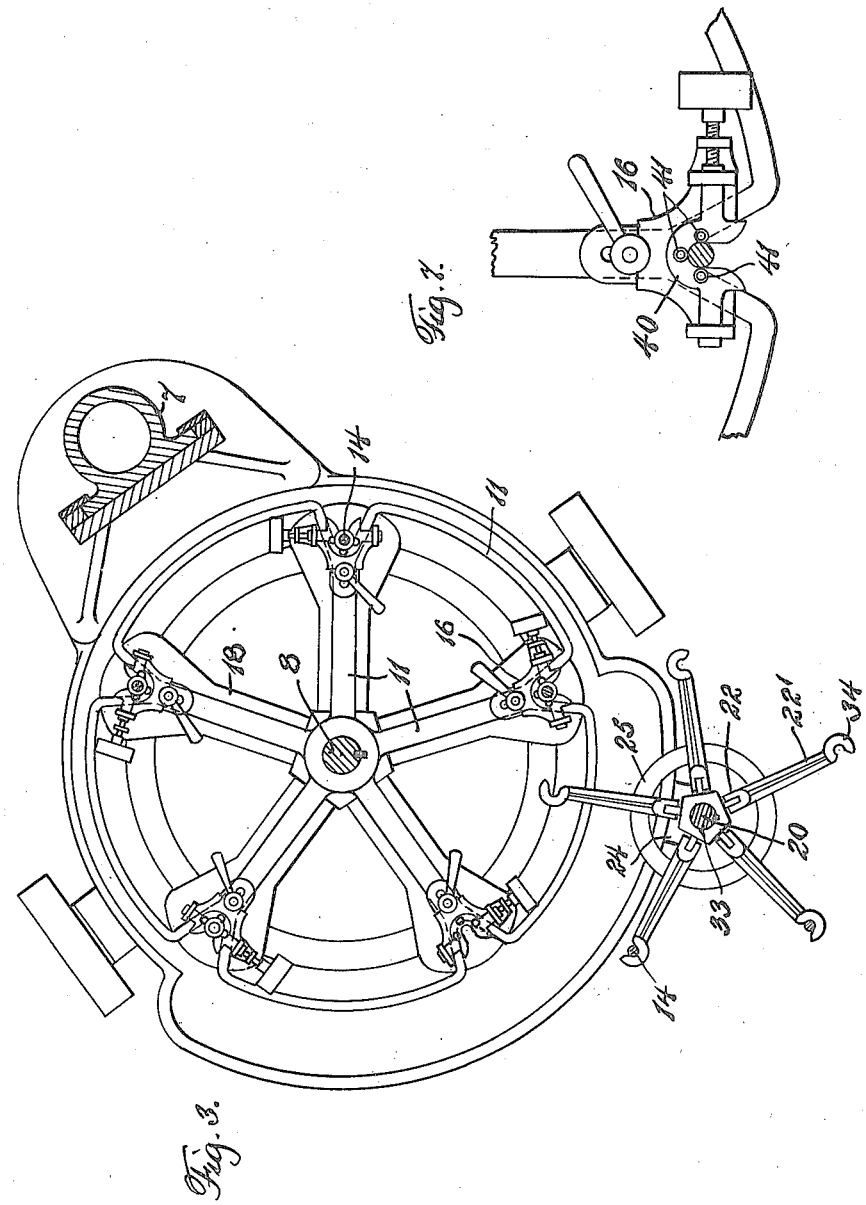

HERMAN A. HEUPEL, OF CHARLEROI, PENNSYLVANIA, ASSIGNOR TO MACBETH-EVANS GLASS COMPANY, OF PITTSBURGH, PENNSYLVANIA, A CORPORATION OF PENNSYLVANIA.

TAKE-OUT MECHANISM FOR GLASS-MACHINES.

1,180,498.   Specification of Letters Patent.   Patented Apr. 25, 1916.

Application filed February 21, 1913. Serial No. 749,825.

*To all whom it may concern:*

Be it known that I, HERMAN A. HEUPEL, a citizen of the United States, residing at Charleroi, in the county of Washington and State of Pennsylvania, have invented certain new and useful Improvements in Take-Out Mechanism for Glass-Machines, of which the following is a specification.

This invention relates in general to take-out mechanism for glass machines and particularly to mechanism for the removal of the blow pipes in glass blowing machines. It has for its primary objects; the provision of an improved mechanism for taking out articles from a glass machine and for preserving the shape of the articles until the glass is set; the provision of an improved mechanism for removing the blow pipes from the glass machine during the operation of the same; and the provision in a take-out mechanism of the character specified of means for supporting the glass articles after removal from the blowing machine. These together with such other objects as may hereinafter appear or are incident to my invention I attain by means of a construction which I have illustrated in preferred form in the accompanying drawings wherein:

Figure 1 is a side elevation of a rotary glass blowing machine of the Owens type showing the application of my invention thereto; Fig. 2 is a section through the machine taken on the line II—II of Figure 1, the parts being drawn on a larger scale; Fig. 3 is a section similar to Fig. 2 but taken on the line III—III of Figure 1; Figs. 4, 5, 6, 7 and 8 illustrate details of the invention hereinafter more fully to be described.

I have shown my invention applied to a rotary machine of the Owens type for blowing hollow glass articles having a bottom. In the general type of machine illustrated, a portion of glass is gathered on the end of a blow-pipe and worked into proper shape, after which the blow pipe is inserted in a rotary framework in the lower part of which are molds for forming the chimneys. Air is supplied through the blow pipes and forms the glass into an article of the shape of the molds. My invention is designed to remove the blow pipe together with the completed glass article after the formative operation just described has taken place, and also to support the bottom of the article in proper shape.

Referring now to Figure 1, it will be seen that the glass machine comprises a framework 7 in which is mounted a vertical shaft 8 on which are mounted a rotary carriage 9 and two spider frames 10 and 11. The shaft 8 is driven from the motor 12 by means of any preferred driving connection. The carriage 9 is provided with a plurality of caps 13 which are adapted to receive the ends of the blow pipes 14, said pipes being releasably supported in the frames 10 and 11 by means of spring jaws 15 and supports 16, respectively carried on the frames 10 and 11. When in operative position the ends of the blow pipes 14 are adapted to project within the split molds 17 which are mounted on a framework 18 carried on the lower portion of the shaft 8, the said molds being opened and closed by the usual automatic mechanism 19. The carriage 9 and caps 13 are operated by the customary mechanism in machines of this type. The frame 10 is provided with five cam pieces 10' which extend beyond the periphery of the frame and are adapted to engage the blow pipes while they are being taken out by the take-out mechanism, as will hereinafter appear more fully.

The take-out mechanism for removing the blow pipes from the glass machine comprises a shaft 20 which is provided with spider frames 21 and 22 having approximately the same vertical position as the frames 10 and 11 so that the blow pipes will be engaged by the take-out mechanism substantially at their point of support in the glass machine. The shaft 20 is rotatably mounted in a stem 23 (see particularly Figs. 1 and 5) which is provided with external threads and is carried in the bracket 24 secured to the body of the glass machine. The stem 23 is raised and lowered to any desired position by means of the hand wheel 25 bearing on the top of the bracket 24 and is locked in such position by means of the clamp 26.

Referring particularly to Figs. 2 and 8, it will be seen that the upper spider 21 is provided with five arms, the ends of which are hooked, as indicated at 27, so as to engage a blow pipe on the glass machine. A means for locking the blow pipes in position in the spider is provided for each arm, the said means comprising a hooked plate 28 pivoted at 29 to the arms and held in the position indicated in Fig. 8 by means of a spring 30. The inward movement of the plates is limited by the abutments 31. The plates are curved so as to embrace the blow pipes and have their outer ends rounded at 32 in order to permit the blow pipes to slide into the hooks 27 against the pressure of the springs 30.

The spider 22 is shown in detail in Figs. 3, 4, 5 and 6. As there illustrated, it comprises five arms, 22', which are pivoted at their inner ends to a collar 33 keyed to the shaft 20 and have their outer ends hooked at 34 to engage the blow pipes. Mounted on the stem 23 immediately beneath the collar 33 is a collar 35 which carries a cam portion 36 the surface of which is interrupted by five grooves 37. Each arm 22' is provided with a downwardly depending projection 38 which carries a roller 39 engaging the surface of the cam member 36, the parts being so arranged that the arms 22' are in a substantially horizontal position when the rollers 39 lie in the grooves 37. When the spider frame is rotated, it will readily be seen that the outer ends of the arms will be elevated slightly when the rollers ride out of the grooves onto the main surface of the cam member 36. The purpose of this arrangement will hereinafter appear.

Referring to Figs. 3 and 7, it will be seen that the supports 16 on the spider 11 comprise an adjustable plate 40 which is recessed to receive the blow pipes and which is provided with three rollers 41 on which the blow pipes are supported by means of the collars 42 (see Fig. 1). The spring-held jaws 15 and the supports 16 furnish a secure mounting for the blow pipes but readily permit of their insertion and removal.

The blow pipes are provided with a second collar or abutment 43 spaced a short distance above the collars 42 and are engaged by the hooks of the arms 22' between the collars in such manner that the collars 43 support the blow pipes in the spider 22 against vertical displacement. The plates 28 of the spider 21 support the blow pipes against lateral displacement with respect to the take-out mechanism. The operative positions of the molds 17 are clearly indicated in Fig. 2.

The operation of the mechanism thus far described is as follows: A blow pipe having a portion of molten glass gathered on its lower end is placed in the glass machine, the lower portion projecting into one of the molds. As the rotative movement of the glass machine continues, the mold is closed and the article is blown, after which the mold opens automatically at a point adjacent the take-out mechanism, and shortly thereafter the blow pipe is engaged by the hooks 34 and 27 of the take-out frames and locked in position. The continued movement of the glass machine imparts rotative movement to the take-out frames and the blow pipe is taken out of the jaws 15 and support 16. At this point one of the cams 10' engages the blow pipe and thrusts it around to one side. As the take-out frames rotate the rollers 39 on the frame 22 ride out of the grooves 37 and the arms 22' are raised slightly, lifting the blow-pipe upwardly thereby clearing the lower part of the glass article from the bottom of the mold. The cam 10' gives the take-out frames sufficient impetus to carry them to the next groove on the cam 36. The grooves thus serve a double function, namely, they provide for the desired vertical movement of the arms 22' and stop the take-out mechanism at proper intervals giving it a step-by-step movement so that the parts are always in operative relation with respect to the glass machine. It will be apparent that the operation just described will be repeated for each mold on the machine. The blow pipes can be readily removed from the take-out frames and the glass article struck off in the usual manner.

From the foregoing it will be seen that the device is simple in construction, effective in operation, and eliminates a large portion of manual labor and increases the rapidity of the operation, thus greatly reducing the cost of production. The operation is entirely automatic, and the liability of breakage is reduced to a minimum.

It will be noted that the molds are adapted to form a hollow glass article having a bottom. In removing articles from a glass machine it has been found that the glass is frequently sufficiently hot to be in a plastic condition in which it will sag or lengthen out. In the type of machine shown the bottom of the glass article is hot and plastic and sags after the removal of the article from the machine. To overcome this defect I provide a pipe 46 leading from a fan 47 driven by the motor 12. The nozzle of the pipe is located immediately beneath the take-out mechanism in position to direct the jet of air against the bottom of the tumbler just taken out of the machine. The column of air supports the bottom of the article until it chills, after which it can be safely removed. It will be understood that the chilling occurs almost instantly. Each successive article is supported over the jet of air during the interval in which the take-out frame is stationary. The advantages of this arrangement will be apparent to those familiar with the art.

Having thus described my invention and illustrated its use, what I claim as new and desire to secure by Letters Patent is the following:

1. In a machine of the class described the combination of a rotary glass forming machine having a blow pipe support adapted to detachably receive a blow pipe, a blow pipe carried thereby, and a rotary take-out mechanism having a plurality of blow pipe engaging means adapted to successively lie in the path of the blow pipe on rotation of the take-out mechanism, rotary movement being imparted to said mechanism by the successive engagement of a blow pipe by said engaging means.

2. In a machine of the class described, the combination of a rotary glass-forming machine having a plurality of radially disposed blow pipe supports adapted to detachably receive blow pipes, a blow pipe in one of said supports, means for rotating the glass machine, and a rotary take-out mechanism having a plurality of radially disposed blow-pipe engaging and removing means adapted to successively lie in the path of a blow pipe, rotary movement being imparted to said take-out mechanism by successive engagement of a blow pipe by said engaging and removing means.

3. In a machine of the class described, the combination of a rotary glass-forming machine having a plurality of radially disposed blow pipe supports adapted to detachably receive blow pipes, a blow pipe in one of said supports, means for rotating the glass machine, and a rotary take-out mechanism having a plurality of radially disposed blow-pipe engaging and removing means adapted to successively lie in the path of a blow pipe, a step-by-step rotary movement being imparted to said take-out mechanism by successive engagement of a blow pipe by said engaging and removing means.

4. In a machine of the class described, the combination of a rotary glass-forming machine having a plurality of radially disposed blow pipe supports adapted to detachably receive blow pipes, a blow pipe in one of said supports, means for rotating the glass machine, a rotary take-out mechanism having a plurality of radially disposed blow-pipe engaging and removing means adapted to successively lie in the path of a blow pipe rotary movement being imparted to said take-out mechanism by successive engagement of a blow pipe by said engaging and removing means, and means for raising said engaging means upon engagement with a blow pipe.

5. In a machine of the class described the combination of a moving glass-forming machine, a blow pipe removably supported thereby, and a movable take-out mechanism having blow-pipe-engaging means adapted to be moved into and out of the path of the blow pipe, movement being imparted to the take-out mechanism by the engagement of the blow pipe by said engaging means.

6. In a machine of the class described a rotary take-out mechanism having a blow pipe engaging member rotatable therewith and pivotally supported to swing upwardly to elevate the blow pipe after engagement therewith.

7. In a machine of the class described a rotary take-out mechanism comprising a hub and plurality of radial blow-pipe-engaging arms pivotally supported on the hub to swing upwardly to elevate the blow pipes respectively engaged thereby.

8. In a machine of the class described a rotary take-out mechanism comprising a hub and plurality of radial blow-pipe-engaging arms pivotally supporting on the hub to swing upwardly to elevate the blow pipes respectively engaged thereby, and means causing said arms to swing upwardly after engagement with a blow pipe.

9. In a machine of the class described a rotary take-out mechanism comprising a hub and plurality of radial blow-pipe-engaging arms pivotally supported on the hub to swing upwardly to elevate the blow pipes respectively engaged thereby, and camming means causing said arms to swing upwardly after engagement with a blow pipe.

10. In a machine of the class described the combination of a moving glass-forming machine having a blow pipe support, a blow pipe carried thereby, a take-out mechanism having a blow-pipe-engaging and removing means located in the path of the moving blow pipe, and means for elevating the blow pipe after engagement by said engaging means whereby to clear the blow pipe and its attached article from the glass forming machine.

11. In a machine of the class described a take-out mechanism comprising a frame mounted for rotary movement about a substantially vertical axis, a plurality of radial arms pivoted at their inner ends to said frame and having blow pipe engaging means at their outer ends, and a cam member adapted to elevate said arms upon engagement with a blow pipe.

12. In a machine of the class described the combination of a take-out mechanism comprising a shaft mounted for movement about a substantially vertical axis, a frame adapted to rotate with said shaft, a plurality of arms pivotally fastened to the frame at their inner ends and provided with blow pipe engaging means adjacent their outer ends, a stationary cam member located beneath the frame, and means on the arms adapted to engage the cam member, said cam member having raised and depressed portions, the raised portions being adapted to elevate the arms as the frame rotates and the depressed portions being adapted to stop the frame and give it a step by step movement.

13. In a machine of the class described the combination of a rotary glass-forming machine having a blow pipe support adapted to detachably receive a blow pipe, a blow pipe carried thereby, and a rotary take-out mechanism mounted for vertical adjustment having a plurality of blow-pipe-engaging means adapted to successively lie in the path of the blow on rotation of the take-out mechanism, rotary movement being imparted to said mechanism by the successive engagement of a blow pipe by said engaging means.

14. In a machine of the class described the combination of a take-out machine for removing a blow pipe with the glass article attached, and means adjacent the take-out mechanism for directing a jet of air against the bottom of the article after removal by the take-out mechanism.

In testimony whereof I have hereunto signed my name in the presence of the two subscribed witnesses.

HERMAN A. HEUPEL.

Witnesses:
C. R. PEREGRINE,
W. S. JAMES.